United States Patent [19]
Brenner et al.

[11] Patent Number: 5,923,702
[45] Date of Patent: Jul. 13, 1999

[54] FREQUENCY HOPPING CELLULAR LAN SYSTEM

[75] Inventors: Pablo Brenner, Raanana; Miri Ratner, Ramat Gan; Leonid Shousterman, Moshav Bene Atarot, all of Israel

[73] Assignee: Breeze Wireless Communications Ltd., Tel Aviv, Israel

[21] Appl. No.: 08/661,008

[22] Filed: Jun. 10, 1996

[51] Int. Cl.[6] .................................................. H04B 15/00
[52] U.S. Cl. .......................... 375/202; 375/200; 370/312
[58] Field of Search .................................. 370/330, 335, 370/515, 522, 540; 375/202, 356; 379/59, 60; 455/33.1, 54.1, 57.1, 53.1, 33.2

[56] References Cited

U.S. PATENT DOCUMENTS

| | | | |
|---|---|---|---|
| 4,606,040 | 8/1986 | David | 375/1 |
| 4,606,041 | 8/1986 | Kadin | 375/1 |
| 4,630,282 | 12/1986 | Landers | 375/1 |
| 4,653,068 | 3/1987 | Kadin | 375/1 |
| 5,123,029 | 6/1992 | Bantz | 375/1 |
| 5,179,569 | 1/1993 | Sawyer | 375/1 |
| 5,210,753 | 5/1993 | Natarajan | 370/95 |
| 5,307,372 | 4/1994 | Sawyer | 375/1 |
| 5,311,504 | 5/1994 | Colamonico | 370/50 |
| 5,324,925 | 6/1994 | Koenck | 235/472 |
| 5,361,401 | 11/1994 | Pirillo | 455/62 |
| 5,371,738 | 12/1994 | Moelard | 370/85.1 |
| 5,381,443 | 1/1995 | Borth et al. | 375/200 |
| 5,384,826 | 1/1995 | Amitay | 379/60 |
| 5,428,636 | 6/1995 | Meier | 375/202 |
| 5,509,027 | 4/1996 | Vook et al. | 375/356 |
| 5,513,210 | 4/1996 | Vook et al. | 375/202 |
| 5,583,866 | 12/1996 | Vook et al. | 370/312 |

OTHER PUBLICATIONS

Draft Standard IEEE 802.11, Wireless LAN, Inst. of Electrical & Electronics Engineers Inc., Jan. 25, 1996.

*Primary Examiner*—Stephen Chin
*Assistant Examiner*—Joseph Roundtree
*Attorney, Agent, or Firm*—Ladas & Parry

[57] ABSTRACT

This invention discloses a frequency hopping cellular LAN system including a LAN, a plurality of access points each operatively connected to the LAN, the plurality of access points including at least a first access point and a second access point, and a station which communicates with at least some of the plurality of access points using frequency hopping spread spectrum wireless communication, wherein the first access point and the second access point each communicate with the station using a first and second predetermined sequence of frequencies respectively, and wherein, during a neighbor beacon interval, the second access point communicates with the station using the first predetermined sequence of frequencies, and wherein the station chooses an access point with which to communicate based, at least in part, on a transmission received from the second access point during the neighbor beacon interval.

A method for choosing an access point with which to communicate in a frequency hopping cellular LAN system is also disclosed.

21 Claims, 8 Drawing Sheets

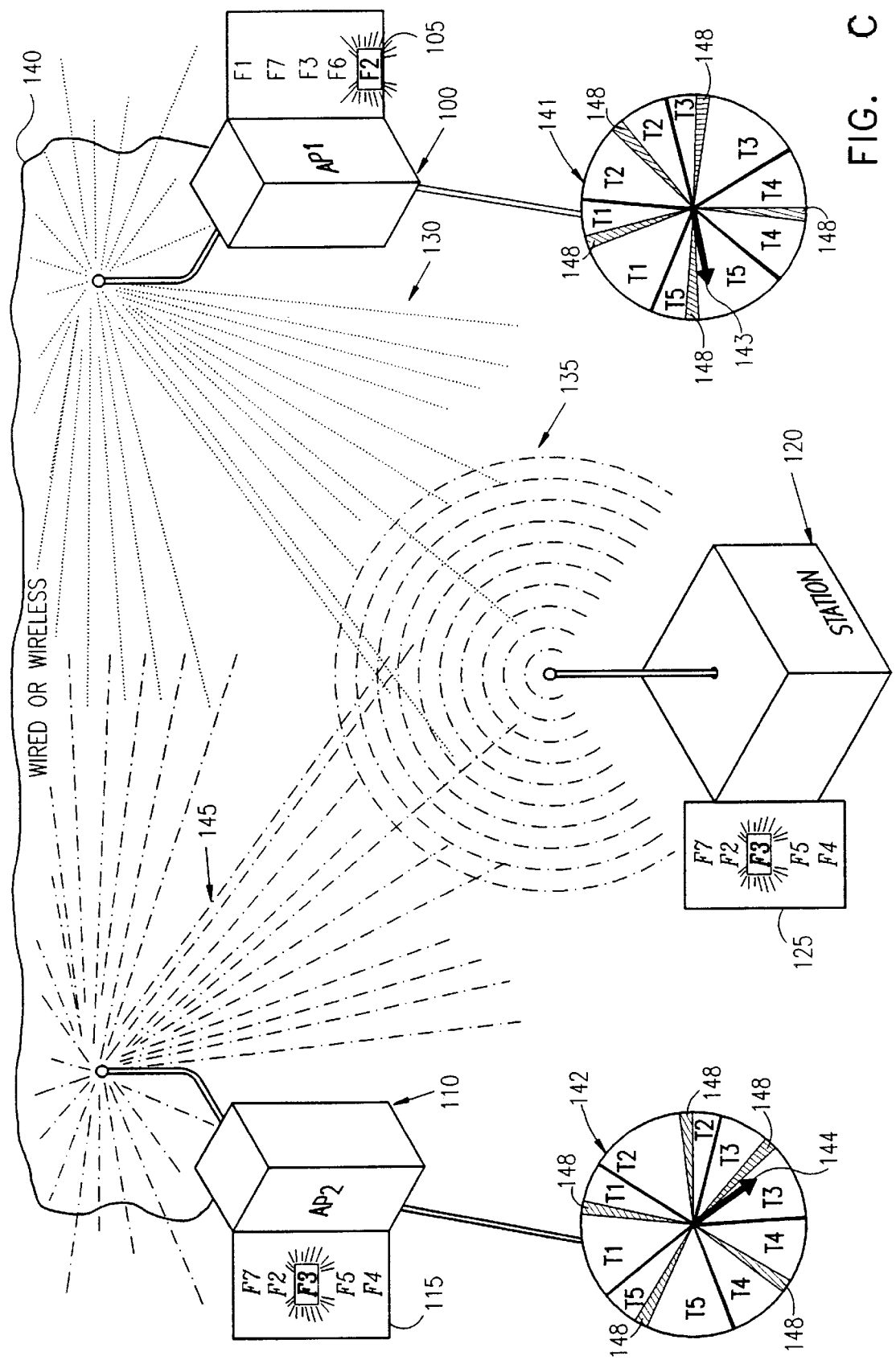
FIG. C

5,923,702

FREQUENCY HOPPING CELLULAR LAN SYSTEM

FIELD OF THE INVENTION

The present invention relates to local area network (LAN) systems in general, and in particular to cellular LAN systems.

BACKGROUND OF THE INVENTION

Local area network (LAN) systems are well known in the art. Cellular LAN systems, which use the technology of cellular radio systems to achieve a wireless LAN system, are also well known. Examples of such systems include the following:

- Altair Plus II, using microwave technology, commercially available from Motorola;
- WaveLAN, using spread spectrum technology, commercially available from A T & T (NCR);
- Collaborative TX and Collaborative Access, using diffuse IR technology, commercially available from Photonics;
- RangeLAN2/ISA and RangeLAN2/Access Point, using spread spectrum technology, commercially available from Proxim;
- Freeport Hub and Freeport Tex., using spread spectrum technology, commercially available from Windata; and
- PCMCIA Netwave and Netwave Access Point, using spread spectrum technology, commercially available from Xircom.

Cellular LAN systems typically comprise a plurality of access points and a plurality of mobile stations, and may also comprise one or more non-mobile stations. The term "access point", as used throughout the present specification and claims, refers to a generally non-mobile station operatively connected to a conventional LAN, and also capable of being in radio contact with one or more mobile stations, as well as one or more non-mobile stations, at any given time. Each access point provides one or more mobile stations with access to a conventional LAN by receiving messages from the one or more mobile stations and forwarding the messages to the conventional LAN and, conversely, by receiving messages from the conventional LAN and forwarding the messages to a mobile station. Each access point typically also provides relay of messages between one mobile station and another mobile station, without necessarily using the conventional LAN.

As a mobile station moves, it may reach a limit, typically a distance limit from the antenna of the access point, for acceptable radio communication for a given access point. When such a limit is reached, it is desirable to hand off the mobile station from the previous access point to a new access point. It is thus necessary to determine when such a hand off should take place. In cellular LAN systems various techniques are used to determine when a mobile station should be handed off from one access point to another access point. For example, a mobile station may be handed off when a connection to an access point is being lost. Alternatively, periodic searching of a plurality of access points may be performed in order to find the best access point.

Technology relevant to cellular LAN systems is described in the following U.S. patents: U.S. Pat. Nos. 5,123,029; 5,324,925; 5,179,569; 5,307,372; 5,361,401; 5,311,504; 5,381,443; 5,361,401; 4,653,068; 4,606,040; 4,606,041; 4,630,282; 5,210,753; and 5,384,826.

U.S. Pat. No. 5,371,738 to Moelard et al describes a wireless local area network system in which communications are switched from a first base station to a second base station based in response to a decision at a mobile wireless station. Moelard does not describe a specific method by which the decision is made.

A draft protocol for wireless LAN communication is described in Draft Standard IEEE 802.11, Wireless LAN, Institute of Electrical and Electronics Engineers, Inc., 345 E. 47th Street, New York, N.Y. 10017, U.S.A., published Jan. 25, 1996.

The disclosures of the above publications and of the publications cited therein are hereby incorporated by reference. The disclosures of all publications mentioned in this specification and of the publications cited therein are hereby incorporated by reference.

SUMMARY OF THE INVENTION

The present invention seeks to provide an improved cellular LAN.

It is a particular object of the present invention to provide improved apparatus and methods for assigning a mobile station to an access point in a cellular LAN, and for handing off a mobile station from one access point to another access point in a cellular LAN. Generally, the present invention uses one or more transmissions of one or more neighboring access points in order to provide the information used for accomplishing the object referred to above.

There is thus provided in accordance with a preferred embodiment of the present invention a frequency hopping cellular LAN system including a LAN, a plurality of access points each operatively connected to the LAN, the plurality of access points including at least a first access point and a second access point, and a station which communicates with at least some of the plurality of access points using frequency hopping spread spectrum wireless communication, wherein the first access point and the second access point each communicate with the station using a first and second predetermined sequence of frequencies respectively, and wherein, during a neighbor beacon interval, the second access point communicates with the station using the first predetermined sequence of frequencies, and wherein the station chooses an access point with which to communicate based, at least in part, on a transmission received from the second access point during the neighbor beacon interval.

Further in accordance with a preferred embodiment of the present invention the station sends a message to the second access point, the message including an identification of the first access point, and, during the neighbor beacon interval, the second access point communicates using a frequency determined, at least in part, based on the identification.

Still further in accordance with a preferred embodiment of the present invention, during the neighbor beacon interval, the second access point communicates using a frequency determined, at least in part, based on a message sent from the first access point to the second access point.

There is also provided in accordance with another preferred embodiment of the present invention a frequency hopping cellular LAN system including a LAN, a plurality of access points each operatively connected to the LAN, the plurality of access points including at least a first access point and a second access point, and a plurality of stations including at least a first station and a second station, each of which communicates with at least some of the plurality of access points using frequency hopping spread spectrum wireless communication, wherein the first access point and the second access point each communicate with the plurality of stations using a first and second predetermined sequence of frequencies respectively, and wherein the first station sends a message to the second access point, the message including an identification of the first access point, and wherein the second access point communicates with the second station during neighbor beacon intervals using a frequency determined, at least in part, based on the identification.

The LAN may include a wired LAN and/or a wireless LAN. The LAN may include an Ethernet LAN.

Further in accordance with a preferred embodiment of the present invention the station sends a message to the second access point, the message including a representation of the first predetermined sequence of frequencies.

Still further in accordance with a preferred embodiment of the present invention the second access point receives a LAN message via the LAN, the LAN message including a representation of the first predetermined sequence of frequencies.

There is also provided in accordance with another preferred embodiment of the present invention a method for choosing an access point with which to communicate in a frequency hopping cellular LAN system, the system including a LAN, a plurality of access points each operatively connected to the LAN, the plurality of access points including at least a first access point and a second access point, and a station which communicates with at least some of the plurality of access points using frequency hopping spread spectrum wireless communication, the method including the first access point and the second access point each communicating with the station using a first and second predetermined sequence of frequencies respectively, during a neighbor beacon interval, the second access point communicating with the station using the first predetermined sequence of frequencies, and the station choosing an access point with which to communicate based, at least in part, on a transmission received from the second access point during the neighbor beacon interval.

There is also provided in accordance with another preferred embodiment of the present invention a method for determining a communication frequency during a neighbor beacon interval in a frequency hopping cellular LAN system, the system including a LAN, a plurality of access points each operatively connected to the LAN, the plurality of access points including at least a first access point and a second access point, and a plurality of stations including at least a first station and a second station, each of which communicates with at least some of the plurality of access points using frequency hopping spread spectrum wireless communication, the method including the first access point and the second access point each communicating with the station using a first and second predetermined sequence of frequencies respectively, sending a message from the station to the second access point, the message including an identification of the first access point, and the second access point communicating with the second station during neighbor beacon intervals using a frequency determined, at least in-part, based on the identification.

BRIEF DESCRIPTION OF THE DRAWINGS

The present invention will be understood and appreciated from the following detailed description, taken in conjunction with the drawings in which:

FIGS. 1A–1D are simplified partly-pictorial, partly block diagram illustrations of a cellular LAN system, constructed and operative in accordance with a preferred embodiment of the present invention;

DETAILED DESCRIPTION OF PREFERRED EMBODIMENTS

Reference is now made to FIGS. 1A–1D which are simplified partly-pictorial, partly block diagram illustrations of a cellular LAN system, constructed and operative in accordance with a preferred embodiment of the present invention. The cellular LAN system of FIGS. 1A–1D preferably comprises a frequency-hopping spread spectrum system.

Frequency-hopping spread spectrum systems generally comprise a plurality of radio transmitter/receivers. In frequency-hopping spread spectrum systems known in the art, each transmitter/receiver is assigned a time schedule and a list of frequencies. The time schedule, which may or may not be the same for each transmitter/receiver in the system, comprises preselected times at which frequency changes are to occur. At predetermined times set by the time schedule, each transmitter/receiver moves to a new frequency as designated by the list of frequencies.

It is appreciated that, generally, the present time of each transmitter/receiver may be somewhat different from the present time of other transmitter/receivers because of inaccuracy in internal clocks typically associated with each transmitter/receiver. Methods for determining the time offset of one transmitter/receiver with respect to other transmitter/receivers are well known in the art.

Typically, in prior art frequency-hopping spread spectrum systems, different transmitter/receivers which are geographically in proximity but which are not in direct communication with each other such as, for example, two base stations or two access points, are assigned lists of frequencies which are generally orthogonal in the sense that the two base stations or access points do not often use the same frequency during the same time interval. In the case of a mobile station in a frequency-hopping spread spectrum system, the mobile station must generally adopt the frequency list of the base station or access point with which the mobile station is to communicate.

It is appreciated that, in the case when two base stations or access points do use the same frequency during the same time interval, it is sometimes possible for one base station or access point to receive transmissions from another base station or access point, and for a mobile station to receive transmissions from more than one base station or access point.

The apparatus of FIGS. 1A–1D comprises a first access point (first AP) 100, including a first AP frequency list 105, and a second access point (second AP) 110, including a second AP frequency list 115. Each of the first AP 100 and the second AP 110 includes frequency hopping spread spectrum radio communication equipment, as is well-known in the art. Each of the first AP 100 and the second AP 110 also includes packetizing apparatus for use in packetizing LAN packets, as is well known in the art.

In FIGS. 1A–1D, two access points are shown for simplicity. It is appreciated that a plurality of access points may be used.

Figure 1A:
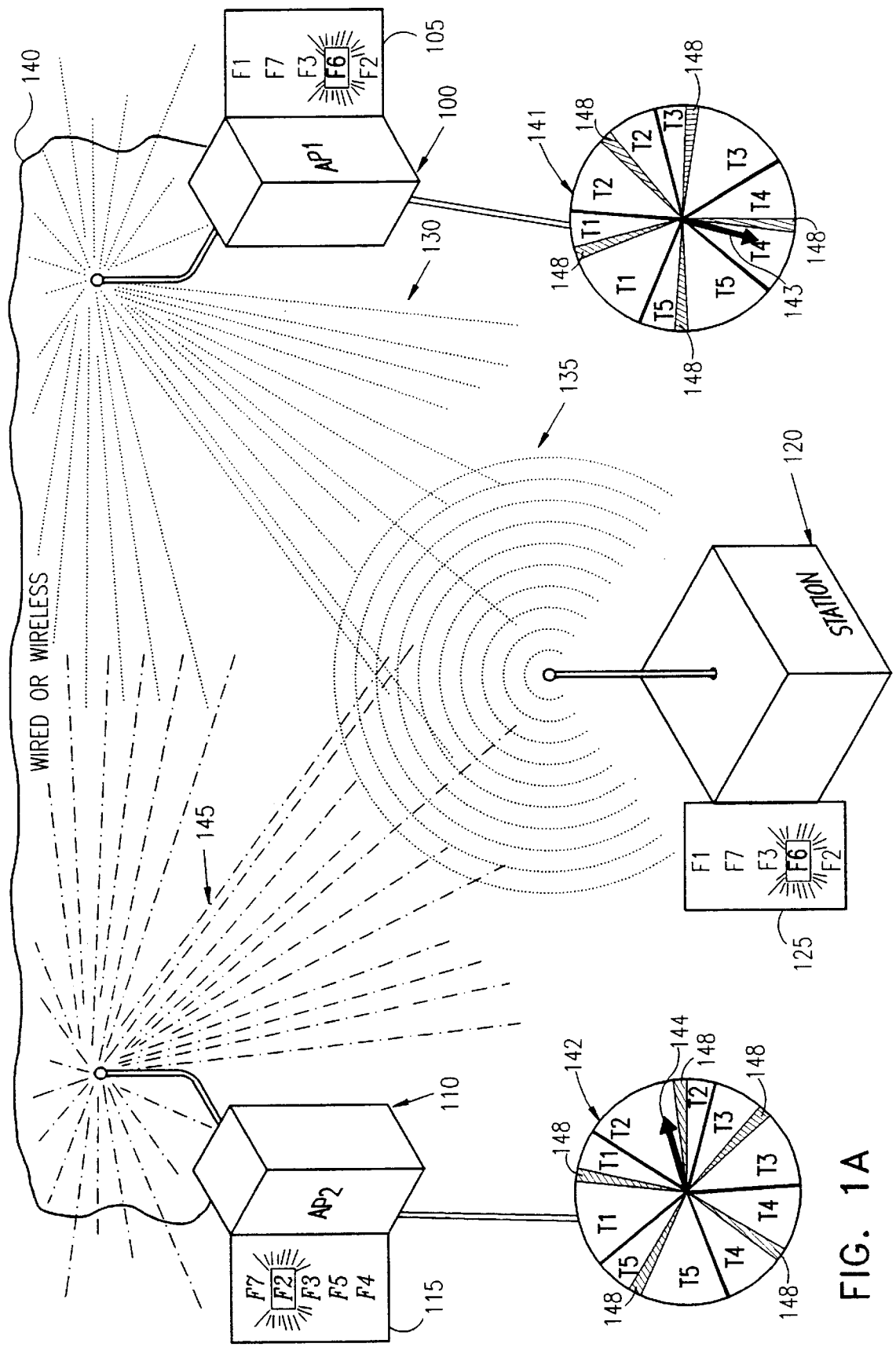

The apparatus of FIGS. 1A–1D further comprises a station 120, typically a mobile station, including a station frequency list 125. In FIG. 1A, the contents of the station frequency list 125 is the same as the contents of the first AP frequency list 105, and therefore the station 120 is in wireless communication with the first AP 100, as shown by first AP transmissions 130 and station transmissions 135. The wireless communication between the station 120 and an AP such as the first AP 100, and other wireless communication in the system of FIGS. 1A–1D, may utilize any appropriate protocol such as, for example, the draft IEEE 802.11 protocol referred to above.

In FIGS. 1A–1D, one station is shown for simplicity. It is appreciated that, typically, the system of FIGS. 1A–1D comprises a plurality of stations.

The apparatus of FIGS. 1A–1D further comprises a LAN 140, which may be any type of wired or wireless LAN. Typically, the LAN 140 comprises an Ethernet LAN.

The apparatus of FIGS. 1A–1D further comprises a plurality of time schedules, each time schedule being typically associated with one AP. The time schedules are shown for illustration purposes in FIGS. 1A–1D as a first clock 141 associated with the first AP 100 and a second clock 142 associated with the second AP 110. Each time schedule, as described above, determines when frequency changes are to occur. For example, when the current time of the first clock 141, indicated by a first clock hand 143, is in region T4 as shown in FIG. 1A, the first AP 100 and the station 120 each transmit and receive on the fourth frequency in their respective frequency lists 105 and 125. A second clock hand 144 of the second clock 142 functions similarly.

Generally, when the clock hand 143 or 144, respectively, of each clock 141 or 142 is in region Tn, the nth frequency in frequency lists 105 or 115, respectively, is used. In a case where a particular AP is in communication with the station 120, the corresponding nth frequency in the frequency list 125, corresponding to the region Tn in the clock associated with the particular AP, is also used.

Typically, the duration of each region Tn is equal. It is appreciated, however, that because of internal time keeping differences as described above, the clock hand 144 may be in a different position in the clock 142 than the clock hand 143 in the clock 141, as depicted in FIGS. 1A–1D, so that the first AP 100 and the second AP 110 may be in different frequency regions at any given time.

The operation of the apparatus of FIGS. 1A–1D is now briefly described. As described above, in FIG. 1A the station 120 communicates with the first AP 100, because the contents of the station frequency list 125 is the same as the contents of the first AP frequency list 105. The second AP 110 sends station transmissions 145 according to the second AP frequency list 115, which includes frequencies which are typically but not necessarily different, for any given time period, from those of the first AP frequency list 105.

In the example of FIG. 1A, the current time period, as depicted by the first clock hand 143 of the first clock 141, corresponds to the region T4, or the fourth frequency in the frequency lists 105 and 125. The current time period, as depicted by the second clock hand 144 of the second clock 142, corresponds to the region T2, or the second frequency in the frequency list 115. The transmission and reception frequencies in FIG. 1A are as follows:
First AP 100 F6
Station 120 F6
Second AP 110 F2

Figure 1B:
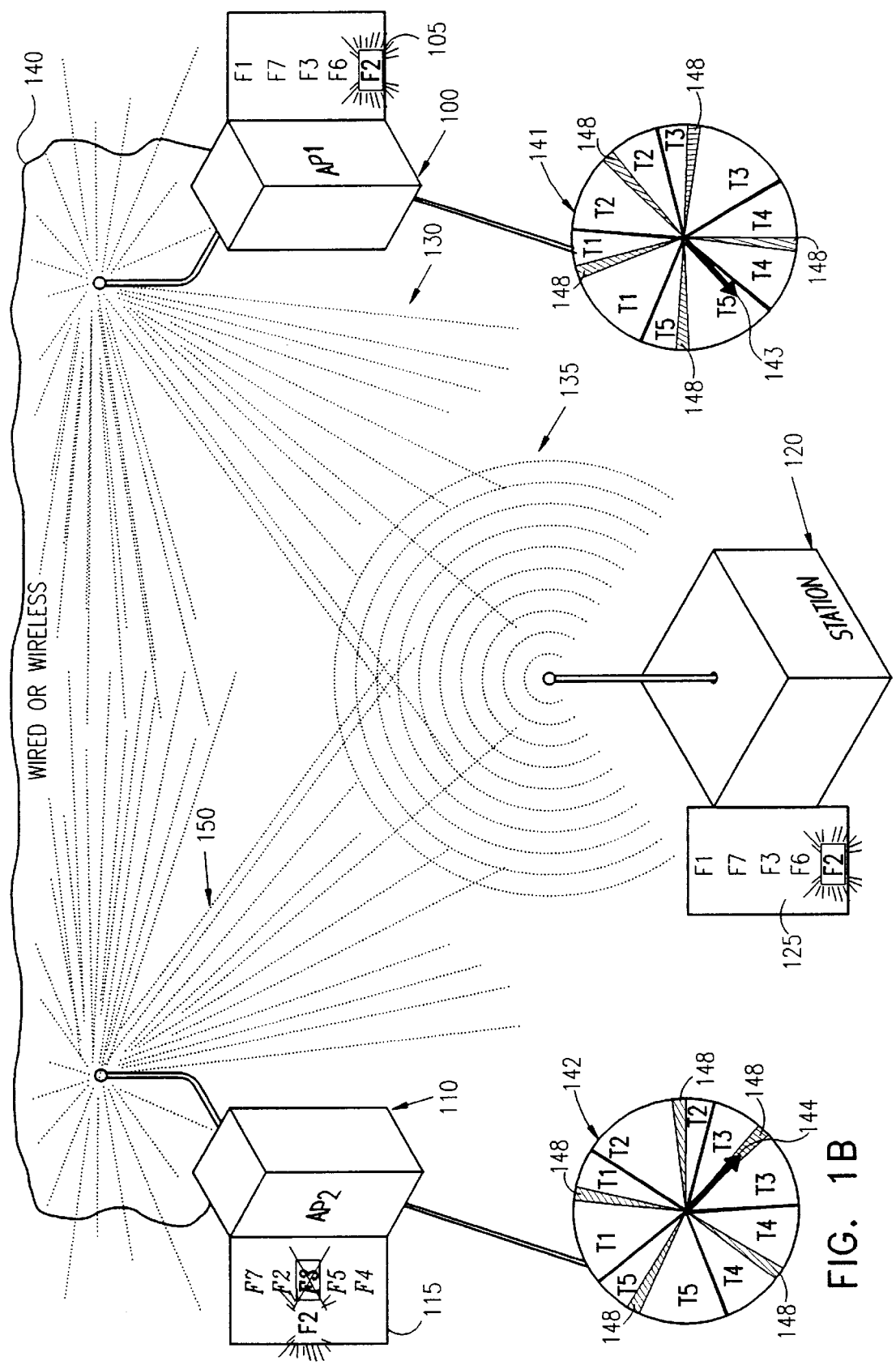

In FIG. 1B, the current time period, as depicted by the first clock hand 143 of the first clock 141, corresponds to the time region T5 and the fifth frequency in each of the frequency list 105 and 125. The current time period, as depicted by the second clock hand 144 of the second clock 142, corresponds to the time region T3 and the third frequency in the frequency list 115. It is appreciated that the current time periods depicted in FIG. 1B are depicted by way of example only for reasons of simplicity, and that the example of FIG. 1B could also apply during the time periods shown in FIG. 1A or during any other time periods. According to the methods of frequency division spread spectrum communication as known in the prior art, the transmission and reception frequencies in FIG. 1B would be according to the frequency lists 105, 115, and 125, as follows:
First AP 100 F2
Station 120 F2
Second AP 110 F3

In FIG. 1B, in accordance with a predetermined schedule associated with the second AP 110 and shown on the associated second clock 142, the second AP 110 has entered a period of time known as a neighbor beacon interval 148. During the neighbor beacon interval 148, an access point, such as the second AP 110, transmits a brief message using a frequency chosen from the frequency list of another access point, corresponding to the present time period, in this case the frequency from the first AP frequency list 105. Thus, in place of the second AP transmissions 145 as shown in FIG. 1A, the second AP 110 transmits beacon transmissions 150, using the frequency assigned for this time interval to the first AP 100. The transmission and reception frequencies in FIG. 1B are therefore:
First AP 100 F2
Station 120 F2
Second AP 110 F2

In FIGS. 1A–1D, one neighbor beacon interval 148 is shown for each region of each of the clocks 141 and 142. It is appreciated that, in general, any number of neighbor beacon intervals 148 may occur at any time and anywhere within a time period Tn. Generally, the number, timing, and duration of neighbor beacon intervals 148 depends on operational characteristics of the system, such as current traffic rate and mobility level of one or more stations such as the station 120. Typically, if the current traffic rate is high, there are fewer neighbor beacon intervals 148.

In order for the second AP 110 to transmit on the frequency associated with the first AP 100 during one of the neighbor beacon intervals 148, it is appreciated that the second AP 110 should preferably have access to information on the frequency list and timing synchronization of the first AP 100, as represented by the first AP frequency list 105 and first clock 141, respectively. It is appreciated that any number of methods may be used to transmit the information to the second AP 110, including, for example: transmission from the first AP 100 to the second AP 110 via the LAN 140; transmission from the first AP 100 to the second AP 110 via wireless transmission; or transmission from a station such as the station 120 that is or has been in communication recently with the first AP 100.

During a neighbor beacon interval 148, if the station 120 does not receive the neighbor beacon transmissions 150 from the second AP 110, no special action occurs, and the station 120 continues to use the frequency list of the first AP 100.

If the station 120 does receive the neighbor beacon transmissions 150 from the second AP 110, the station 120 is preferably operable to compare the neighbor beacon transmissions 150 with the first AP transmissions 130 to determine which of the transmissions 150 or 130 is better received. Typically, some measure well known in the art, such as signal strength or signal quality, is used to determine which of the transmissions 150 or 130 is better received. If the first AP transmissions 130 are better received, no special action occurs, and the station 120 continues to use the frequency list of the first AP 100.

If the neighbor beacon transmissions 150 are better received, the station 120 is preferably operative to initiate and perform a hand-off to the second AP 110. A number of suitable methods for performing hand off are well known in the art, and any such suitable method may be used, excluding the use of scanning. Thus, the station 120 begins to communicate with the second AP 110 using the second AP frequency list 115.

FIG. 1C depicts the case where in FIG. 1B the neighbor beacon transmissions 150 were better received than the first AP transmissions 130. In FIG. 1C the station 120 is shown in communication with the second AP 110 using the second AP frequency list 115.

The particular frequencies used for the frequency lists 105, 115, and 125 and the times of occupancy for each frequency may vary based, in part, on national regulatory requirements for radio frequency transmission. In the United States, for example, the 2400–2483.5 MHz band and the 5725–5850 MHz band may typically be used. For these bands in the U.S., at least 75 different hopping frequencies are used, with average time of occupancy on any frequency not greater than 0.4 seconds within a 30 second period.

Figure 1D:
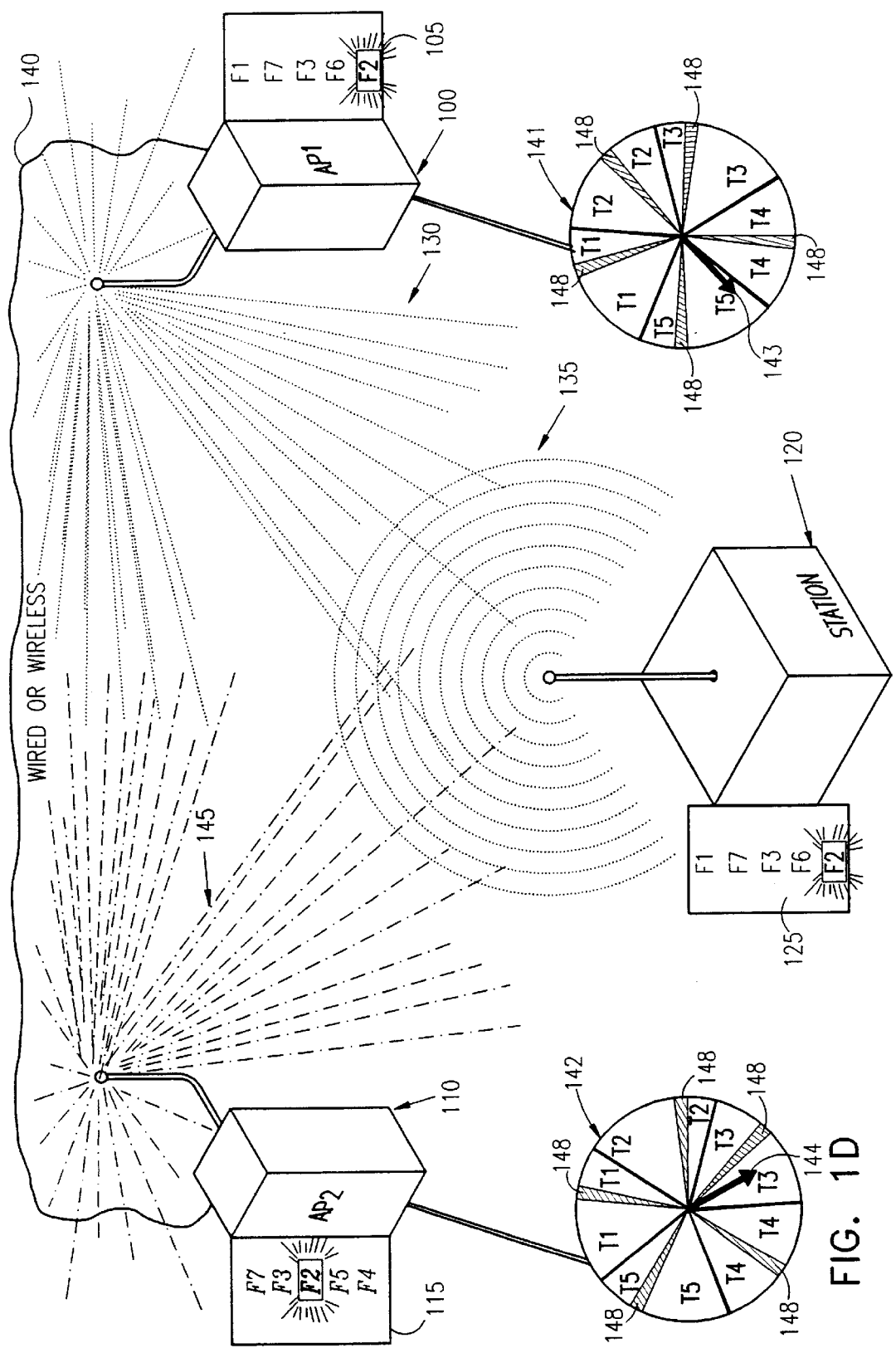

In addition to what has been described above, it is appreciated that, in a case where the first AP 100 and the second AP 110 use the same frequency at the same time, as depicted in FIG. 1D, it is possible for the station 120 to receive both transmissions and to behave in the same way as if a neighbor beacon interval is in progress, as described above. Such a situation is termed herein a regular beacon interval. It is appreciated that a regular beacon interval is sufficiently similar to a neighbor beacon interval that methods of operation during a neighbor beacon interval, as described herein, may also occur during a regular beacon interval.

Figure 2:
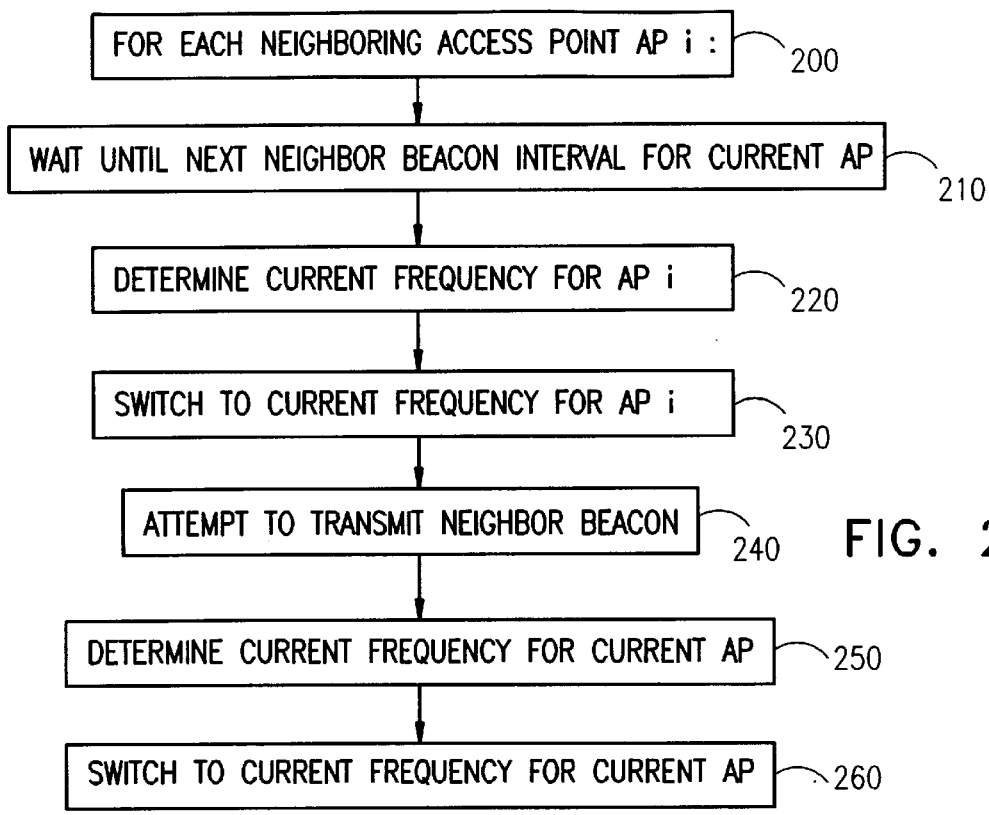
FIG. 2 is a simplified flowchart illustration of a preferred method of operation of the second AP 110 of FIGS. 1A–1D.

Reference is now made to FIG. 2, which is a simplified flowchart illustration of a preferred method of operation of the second AP 110 of FIGS. 1A–1D. For simplicity, the method of FIG. 2 is described as a method of operation of the second AP 110 of FIGS. 1A–1D. It is appreciated that, in general, the method of FIG. 2 is applicable to each of the plurality of access points that may be comprised in the system of FIGS. 1A–1D.

The method of FIG. 2 preferably comprises the following steps:

For each access point APi which is a neighbor of the second AP 110 (step 200), the second AP 110 waits until the next neighbor beacon interval for the second AP 110 (step 210). The second AP 110 then determines the current frequency for access point APi (step 220), and switches to the current frequency for APi (step 230).

The second AP 110 attempts to transmit a neighbor beacon message using the current frequency for APi (step 240). Typically, the neighbor beacon message will be transmitted if sufficient system resources are available such as, for example, if the neighbor beacon frequency is not currently busy. The second AP 110 then determines the current frequency assigned to the second AP 110 (step 250), which may have changed during the neighbor beacon interval. The second AP 110 then switches to its currently assigned frequency (step 260).

Figure 3:
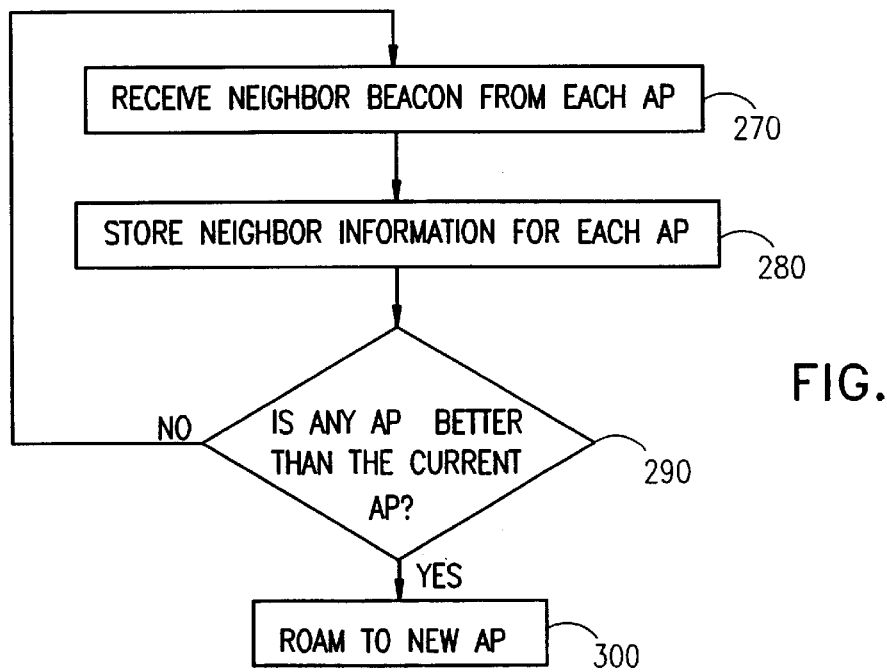
FIG. 3 is a simplified flowchart illustration of a preferred method of operation of the station 120 of FIGS. 1A–1D.

Reference is now made to FIG. 3, which is a simplified flowchart illustration of a preferred method of operation of the station 120 of FIGS. 1A–1D. For simplicity, the method of FIG. 3 is described as a method of operation of the station 120 of FIGS. 1A–1D. It is appreciated that, in general, the method of FIG. 3 is applicable to each of the plurality of stations that may be comprised in the system of FIGS. 1A–1D.

The method of FIG. 3 is described in terms of a neighbor beacon message. It is appreciated that the method is also applicable in the case of a regular beacon message, as described above. The method of FIG. 3 preferably includes the following steps:

The station 120 receives a neighbor beacon message from each access point which sends such a message (step 270). Typically, the neighbor beacon message comprises: a timer sequence indication; an indication of the frequency list being used by the access point, typically a number identifying the frequency list; and an indication of the load currently existing on the access point. It is appreciated that, in practice, some messages may not be received, in which case those access points whose neighbor beacon messages are not received are ignored in further steps of the method of FIG. 3.

Neighbor information based on the neighbor beacon message is stored for each access point (step 280). Typically, the neighbor information comprises information from the neighbor beacon message including, for example, the time sequence indication and the load indication referred to above, and additionally comprising an indication of signal quality received. Signal quality may be determined, for example, according to any method well-known in the art.

The information stored for each access point is compared to information available for the current access point, such as the first AP 100, and a determination is made as to whether any of the access points which sent neighbor beacon information are better than the current access point (step 290). The determination as to whether an access point is better than the current access point is typically made according to predetermined criteria as, for example, by computing a weighted score based on load information and signal quality.

If any of the access points which sent neighbor beacon information is determined in step 290 to be better than the current access point, the station 120 roams to the new access point (step 300). The term "roam", as used throughout the specification, refers to a sequence of steps typically including switching to the frequency of the new access point and sending a message to the new access point requesting to switch to the new access point. Roaming is also known as hand off, and any suitable hand off method, not including scanning, well known in the art may be used in step 300. If the answer to step 290 is negative the processing continues with steps 270 and 280.

Figure 4:
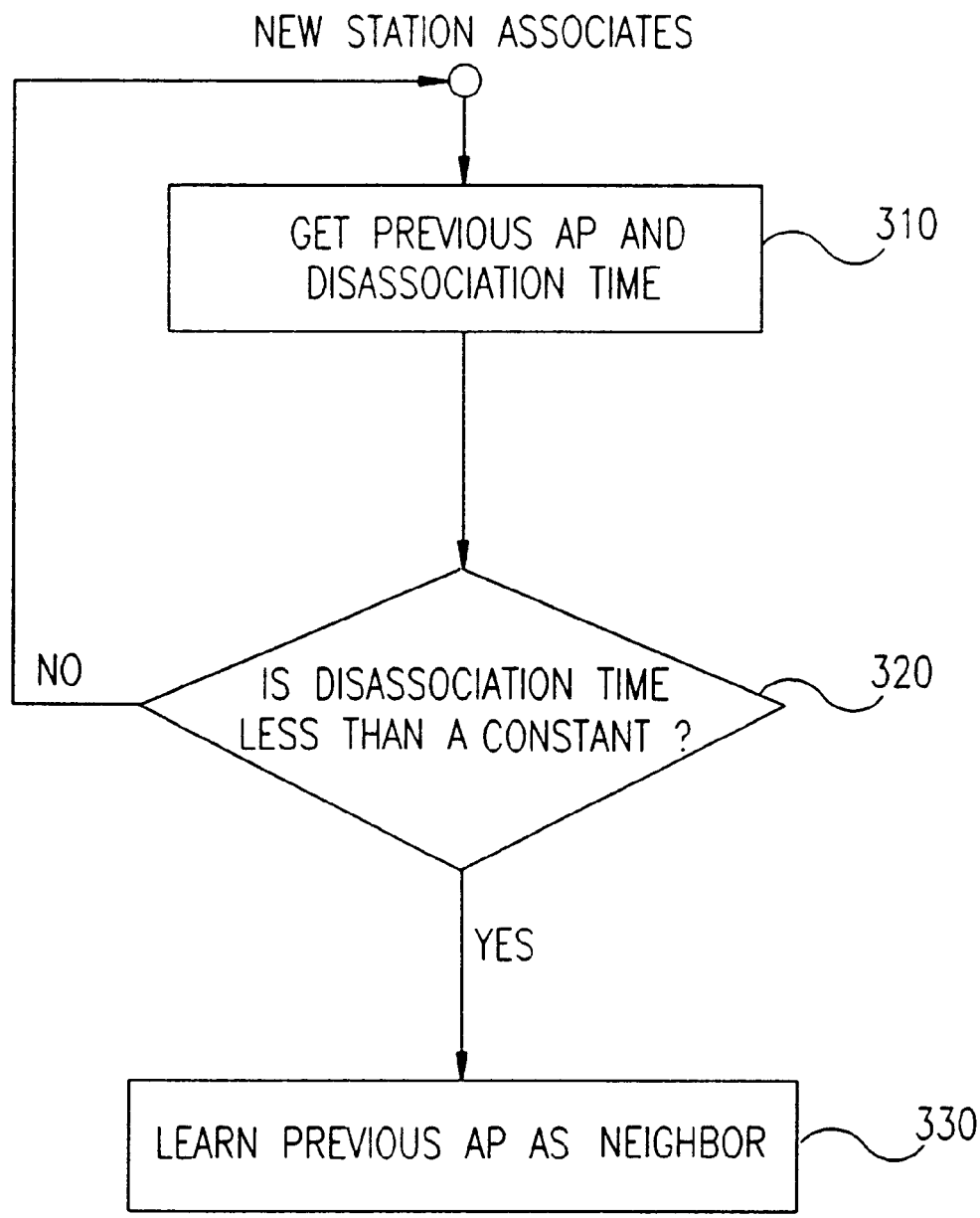
FIG. 4 is a simplified flowchart illustration of a preferred method for determining the neighbors of an access point, useful for operation of the second access point 110 of FIGS. 1A–1D.

Reference is now made to FIG. 4, which is a simplified flowchart illustration of a method for determining the neighbors of an access point, useful for operation of the second access point 10 of FIGS. 1A–1D. For simplicity, the method of FIG. 4 is described as a method of operation of the second AP 110 of FIGS. 1A–1D. It is appreciated that, in general, the method of FIG. 4 is applicable to each of the plurality of access points that may be comprised in the system of FIGS. 1A–1D.

The method of FIG. 4 is useful for determining which of a plurality of access points is a neighbor of the second access point 110.

It is appreciated that, as described above, each AP should preferably have access to information on the frequency schedule and timing synchronization of neighboring APs, and that any number of methods may be used to transmit the information to an AP, including, for example: transmission from the first AP to the second AP via the LAN 140 of FIGS. 1A–1D; transmission from the first AP to the second AP via wireless transmission; or transmission from a station such as the station 120 of FIG. 1 that is, or has been in communication recently with the first AP 100.

The method of FIG. 4 preferably includes the following steps:

Get the identification of the previous AP and the associated disassociation time (step 310).

Check whether the disassociation time, which indicates the time elapsed since the previous disconnection from an AP, is less than a predetermined constant (step 320). Typically, the constant represents a long period such as, for example, 30 seconds. A long dissociation time may indicate, for example, that there is probably no overlapping area between the areas covered by the two APs, which would make it preferable not to consider the previous AP as a neighbor.

If the disassociation time is greater than or equal to the predetermined constant, processing continues with step 310. Otherwise, the previous AP is learned as a neighbor of the current AP (step 330.)

Figure 5:
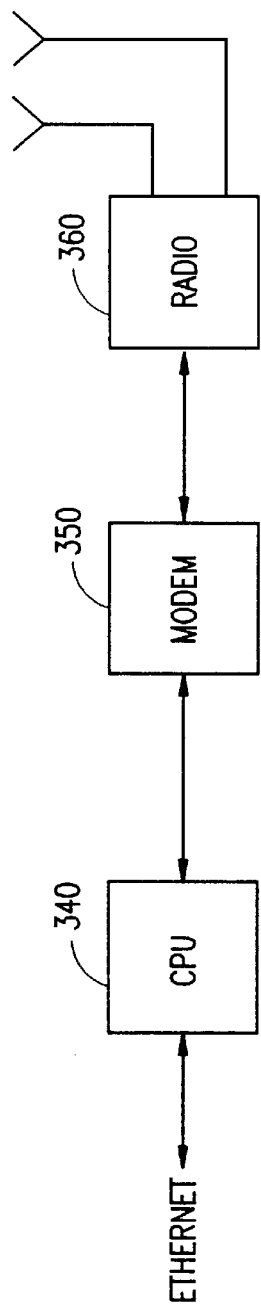
FIG. 5 is a simplified block diagram illustration of a preferred implementation of the first access point 100 and the second access point 110 of FIGS. 1A–1D.

Reference is now made to FIG. 5, which is a simplified block diagram illustration of a preferred implementation of the first access point 100 and the second access point 110 of FIGS. 1A–1D. The apparatus of FIG. 5 comprises a CPU 340, a modem 350, and a radio 360. The CPU 340 is operatively attached to a LAN, shown in FIG. 5 as an Ethernet LAN. It is appreciated that any other suitable type of network may be used.

Figure 6:
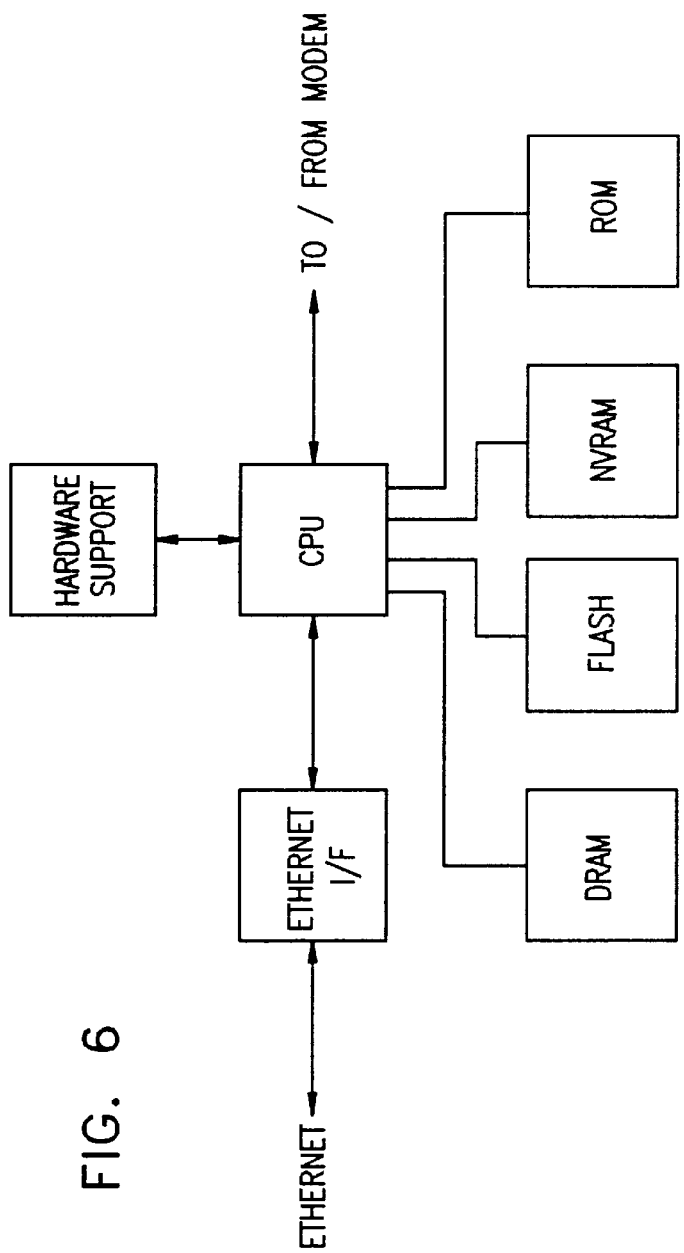
FIG. 6 is a simplified block diagram illustration of a preferred implementation of the CPU 340 of FIG. 5.

Reference is now additionally made to FIG. 6, which is a simplified block diagram illustration of a preferred implementation of the CPU 340 of FIG. 5, including the connections of the CPU 340 to the other components of FIG. 5.

Figure 7:
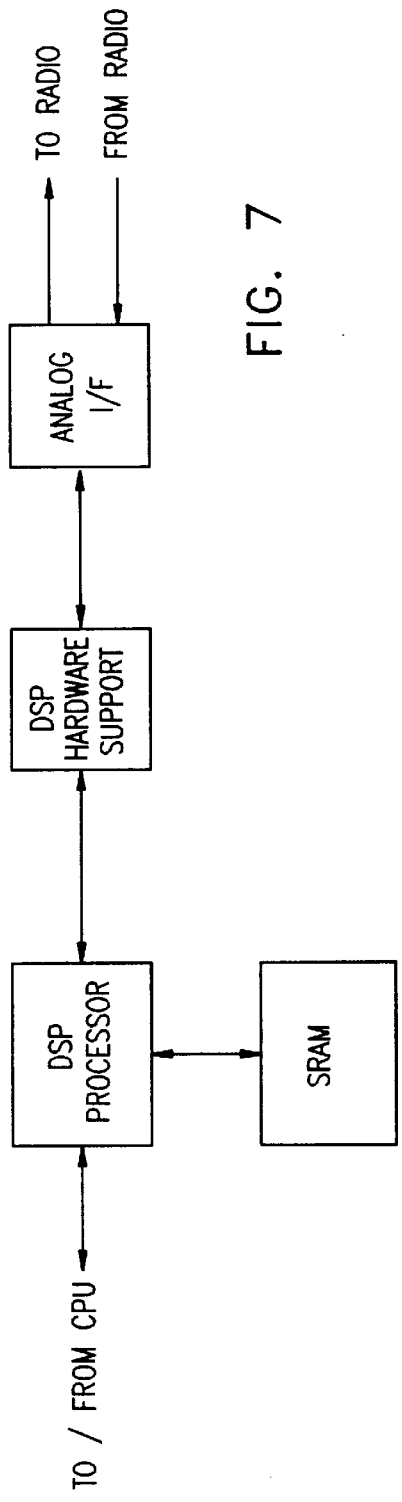
FIG. 7 is a simplified block diagram illustration of a preferred implementation of the modem 350 of FIG. 5.

Reference is now additionally made to FIG. 7, which is a simplified block diagram illustration of a preferred implementation of the modem 350 of FIG. 5, including the connections of the modem 350 to the other components of FIG. 5.

Figure 8:
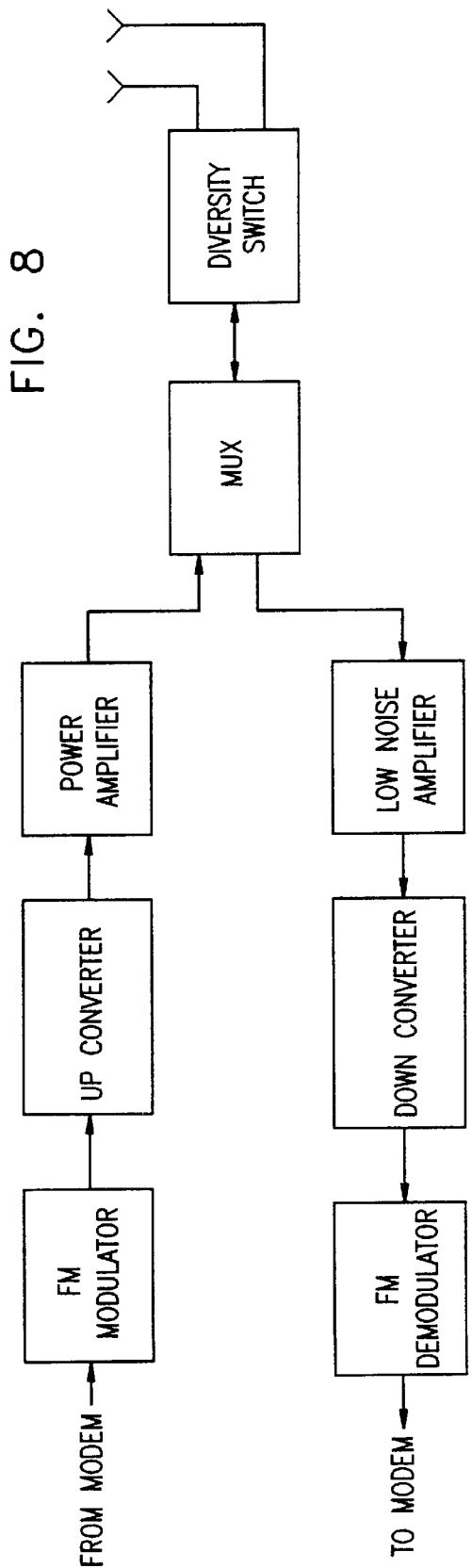
FIG. 8 is a simplified block diagram illustration of a preferred implementation of the radio 360 of FIG. 5.

Reference is now additionally made to FIG. 8, which is a simplified block diagram illustration of a preferred implementation of the radio 360 of FIG. 5, including the connections of the radio 360 to the other components of FIG. 5.

FIGS. 5–8 are self-explanatory.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. A frequency hopping cellular LAN system comprising:
   a LAN;
   a plurality of access points each operatively connected to said LAN, said plurality of access points comprising at least a first access point and a second access point; and
   a station which communicates with at least some of the plurality of access points using frequency hopping spread spectrum wireless communication,
   wherein said first access point and said second access point each communicate with said station using a first and second predetermined sequence of frequencies respectively, and
   wherein, during a neighbor beacon interval, said second access point communicates with said station using said first predetermined sequence of frequencies, and
   wherein said station chooses an access point with which to communicate based, at least in part, on a transmission received from said second access point during said neighbor beacon interval.

2. A system according to claim 1 and wherein said station sends a message to said second access point, said message comprising an identification of said first access point, and
   wherein, during said neighbor beacon interval, said second access point communicates using a frequency determined, at least in part, based on said identification.

3. A system according to claim 2 and wherein, during said neighbor beacon interval, said second access point communicates using a frequency determined, at least in part, based on a message sent from said first access point to said second access point.

4. A frequency hopping cellular LAN system comprising:
   a LAN;
   a plurality of access points each operatively connected to said LAN, said plurality of access points comprising at least a first access point and a second access point; and
   a plurality of stations comprising at least a first station and a second station, each of which communicates with at least some of the plurality of access points using frequency hopping spread spectrum wireless communication,
   wherein said first access point and said second access point each communicate with said plurality of stations using a first and second predetermined sequence of frequencies respectively, and
   wherein said first station sends a message to said second access point, said message comprising an identification of said first access point, and
   wherein said second access point communicates with said second station during neighbor beacon intervals using a frequency determined, at least in part, based on said identification.

5. A system according to claim 1 and wherein said LAN comprises a wired LAN.

6. A system according to claim 4 and wherein said LAN comprises a wired LAN.

7. A system according to claim 1 and wherein said LAN comprises a wireless LAN.

8. A system according to claim 4 and wherein said LAN comprises a wireless LAN.

9. A system according to claim 1 and wherein said LAN comprises an Ethernet LAN.

10. A system according to claim 4 and wherein said LAN comprises an Ethernet LAN.

11. A system according to claim 1 and wherein said station sends a message to said second access point, said message comprising:
a representation of said first predetermined sequence of frequencies; and
frequency timing information associated with said first predetermined sequence of frequencies.

12. A system according to claim 4 and wherein said first station sends a message to said second access point, said message comprising:
a representation of said first predetermined sequence of frequencies; and
frequency timing information associated with said first predetermined sequence of frequencies.

13. A system according to claim 1 and wherein said second access point receives a LAN message via said LAN, said LAN message comprising a representation of said first predetermined sequence of frequencies.

14. A system according to claim 4 and wherein said second access point receives a LAN message via said LAN, said LAN message comprising a representation of said first predetermined sequence of frequencies.

15. A method for choosing an access point with which to communicate in a frequency hopping cellular LAN system, the system comprising a LAN, a plurality of access points each operatively connected to said LAN, said plurality of access points comprising at least a first access point and a second access point, and a station which communicates with at least some of the plurality of access points using frequency hopping spread spectrum wireless communication, the method comprising:
said first access point and said second access point each communicating with said station using a first and second predetermined sequence of frequencies respectively;
during a neighbor beacon interval, said second access point communicating with said station using said first predetermined sequence of frequencies; and
said station choosing an access point with which to communicate based, at least in part, on a transmission received from said second access point during said neighbor beacon interval.

16. A method for determining a communication frequency during a neighbor beacon interval in a frequency hopping cellular LAN system, the system comprising a LAN, a plurality of access points each operatively connected to said LAN, said plurality of access points comprising at least a first access point and a second access point, and a plurality of stations comprising at least a first station and a second station, each of which communicates with at least some of the plurality of access points using frequency hopping spread spectrum wireless communication, the method comprising:
said first access point and said second access point each communicating with said station using a first and second predetermined sequence of frequencies respectively;
sending a message from said station to said second access point, said message comprising an identification of said first access point; and
said second access point communicating with said second station during neighbor beacon intervals using a frequency determined, at least in part, based on said identification.

17. A method according to claim 15 and also comprising:
said station switching communication to the chosen access point,
wherein said step of switching does not include scanning.

18. A system according to claim 1 wherein during said neighbor beacon interval and second access point communicates with said station using a frequency chosen from said first predetermined sequence of frequencies and corresponding to a time period.

19. A system according to claim 4 wherein during said second access point communicates with said second station during neighbor beacon intervals using a frequency determined, at least in part, based on a time period corresponding to said frequency.

20. A method according to claim 15 wherein said during a neighbor beacon interval-communicating step comprises communicating with said station using a frequency chosen from said first predetermined sequence of frequencies and corresponding to a time period.

21. A method according to claim 16 wherein said second access point communicating with said second station step comprises communicating with said second station during neighbor beacon intervals using a frequency determined, at least in part, based on a time period corresponding to said frequency.

* * * * *